US012716782B2

(12) United States Patent
Stein et al.

(10) Patent No.: US 12,716,782 B2
(45) Date of Patent: Aug. 25, 2026

(54) CONTROL DEVICE FOR A FOOD THERMOMETER AND SYSTEM COMPRISING CONTROL DEVICE AND FOOD THERMOMETER

(71) Applicant: Vorwerk & Co. Interholding GmbH, Wuppertal (DE)

(72) Inventors: Matthias Stein, Mülheim an der Ruhr (DE); Fabian Schulz, Oberhausen (DE); Mirco Serndt, Velbert (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 521 days.

(21) Appl. No.: 18/093,173

(22) Filed: Jan. 4, 2023

(65) Prior Publication Data

US 2023/0228628 A1 Jul. 20, 2023

(30) Foreign Application Priority Data

Jan. 17, 2022 (EP) .................................... 22151701

(51) Int. Cl.
*G01K 3/00* (2006.01)
*G01K 7/00* (2006.01)

(52) U.S. Cl.
CPC ............... *G01K 3/005* (2013.01); *G01K 7/00* (2013.01)

(58) Field of Classification Search
CPC ...... G01K 3/005; G01K 7/00; G01K 2207/06; G01K 2215/00; G01K 1/024; G01K 3/00
See application file for complete search history.

(56) References Cited

U.S. PATENT DOCUMENTS 10,732,054 B2 * 8/2020 Calhoun, Jr. .......... G01K 1/024
2010/0012645 A1 * 1/2010 Baier .................... G01K 13/00 219/413
2017/0248474 A1 * 8/2017 Nielsen .................. G01K 1/024
2018/0120167 A1 5/2018 Hammer et al.
2019/0250043 A1 * 8/2019 Wu ........................ G01K 3/005
2020/0141813 A1 * 5/2020 Nivala .................. G01K 13/00
2020/0357260 A1 11/2020 Allen, Sr.
2021/0298334 A1 9/2021 Wang

FOREIGN PATENT DOCUMENTS

CN 110998262 A * 4/2020 ............. G01K 1/024
DE 102014217010 A1 3/2016
DE 102020109367 A1 * 5/2021
EP 2667167 B1 * 9/2015 ............. G01K 13/00
WO WO-2017059325 A1 * 4/2017 ............... A23L 5/13

OTHER PUBLICATIONS

European Search Report for Application No. 22151701.4-1001; dated Jul. 22, 2022, 2 pages.

* cited by examiner

*Primary Examiner* — Julia Fitzpatrick
(74) *Attorney, Agent, or Firm* — Barnes & Thornburg

(57) ABSTRACT

The present disclosure relates to a control device for a food thermometer and a system comprising an electric food thermometer and the control device. By means of the control device, the energy consumption of the food thermometer can be kept low.

Figure 1:
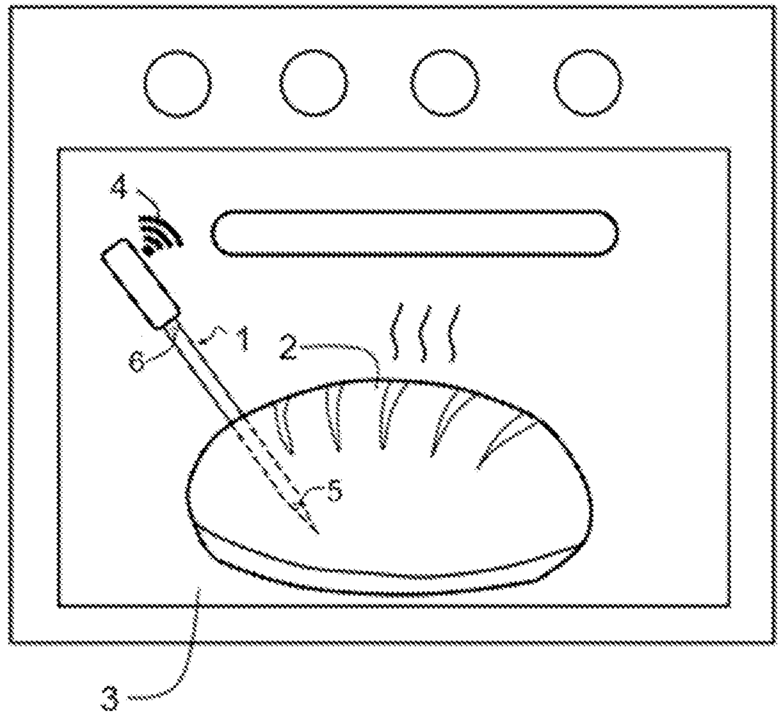

The control device for a food thermometer, which can control the measurement of temperatures by the food thermometer, is configured such that intervals between temperature measurements by the food thermometer depending on the preparation of a food are controlled by the food thermometer.

18 Claims, 3 Drawing Sheets

CONTROL DEVICE FOR A FOOD THERMOMETER AND SYSTEM COMPRISING CONTROL DEVICE AND FOOD THERMOMETER

CROSS-REFERENCE TO RELATED APPLICATION

This application claims priority to European Application No. 22151701.4, filed Jan. 17, 2021, which application is hereby incorporated in its entirety here in.

FIELD OF THE DISCLOSURE

The present disclosure relates to a control device for a food thermometer and a system comprising an electric food thermometer and the control device.

BACKGROUND

A food is a nourishment prepared from one or more foodstuffs. The preparation may comprise warming or heating. The preparation of a food then comprises the supply of heat to a cooked product formed by one or more foodstuffs. Examples of foodstuffs and/or a product to be cooked formed by foodstuffs that can be prepared by warming or heating are meat, vegetables, or dough for baked goods.

A food thermometer is a temperature measuring device designed and suitable for measuring temperatures in a food product or foodstuff during its preparation. A food thermometer can therefore measure temperatures that may occur during the preparation of a food. Temperatures that significantly deviate from this cannot be measured. In addition, a food thermometer can withstand the surrounding conditions that can occur during the preparation of a food.

As a rule, temperatures of less than 200° C. are reached when preparing a food. However, temperatures of 350° C. can also be reached, for example for baking a pizza. Temperatures of more than 350° C. are generally not exceeded. A food thermometer in the sense of the present disclosure is therefore configured such that temperatures above 400° C., preferably above 300° C., particularly preferably above 250° C., can no longer be measured. In principle, the food thermometer is configured such that this can be used in a conventional baking oven, i.e. at temperatures of up to 250° C. or 220° C.

SUMMARY

A food thermometer in the sense of the present disclosure is not designed to be able to measure very low temperatures such as, for example, temperatures significantly below sub-zero temperatures as are reached in household freezers. Thus, a food thermometer in the sense of the present disclosure is not designed to measure temperatures lower than −70° C. In principle, a food thermometer in the sense of the present disclosure is designed so that it cannot measure temperatures below −50° C. because food is generally produced with a supply of heat and very low temperatures are only applied for freezing a food.

A food thermometer in the sense of the present disclosure can withstand a steam atmosphere. A food thermometer is therefore generally encapsulated in a waterproof manner. A food thermometer in the sense of the present disclosure is resistant to common ingredients of a food, such as acid of lemons or vinegar.

A food thermometer may be intended and suitable to be pierced (inserted) into a product to be cooked to be able to measure a temperature inside the product to be cooked. For this purpose, a food thermometer may comprise an elongated probe having a pointed end or at least a very thin end to enable the probe to be pierced into relatively solid nourishment such as meat. The probe comprises a sensor by means of which a temperature can be measured. A food thermometer may comprise a handle portion that is not intended and suitable to be inserted into the food. The handle portion may be grasped by a user to allow the food thermometer to be withdrawn (removed) from a nourishment or food. The handle portion may also comprise a sensor by means of which a temperature can be measured. The surrounding temperature outside a nourishment or food can then also be measured.

A food thermometer in the sense of the present disclosure requires electrical power for its operation and is therefore an electrical food thermometer. The food thermometer may therefore comprise a battery, i.e., a storage for electrical energy. The storage may provide the electrical energy required for operation of the food thermometer. As a rule, the battery is a rechargeable battery.

The control device for the food thermometer can control the measurement of temperatures by the food thermometer. The control device is therefore able to send control commands to the food thermometer. The control device may be part of the thermometer. The control device may be a device independent of the food thermometer. There is then no permanent mechanical connection between the control device and the food thermometer. The sending of control commands can then be done wirelessly, for example.

The control device may be part of a kitchen appliance. The kitchen appliance may be, for example, an oven, a microwave, a steamer, a refrigerator, a freezer, or a food processor.

The present disclosure aims at keeping the energy demand for the operation of the electric food thermometer low.

A control device having the features of the first claim serves to solve the task. The dependent claims relate to advantageous embodiments.

BRIEF DESCRIPTIONS OF THE DRAWINGS

Figure 2:
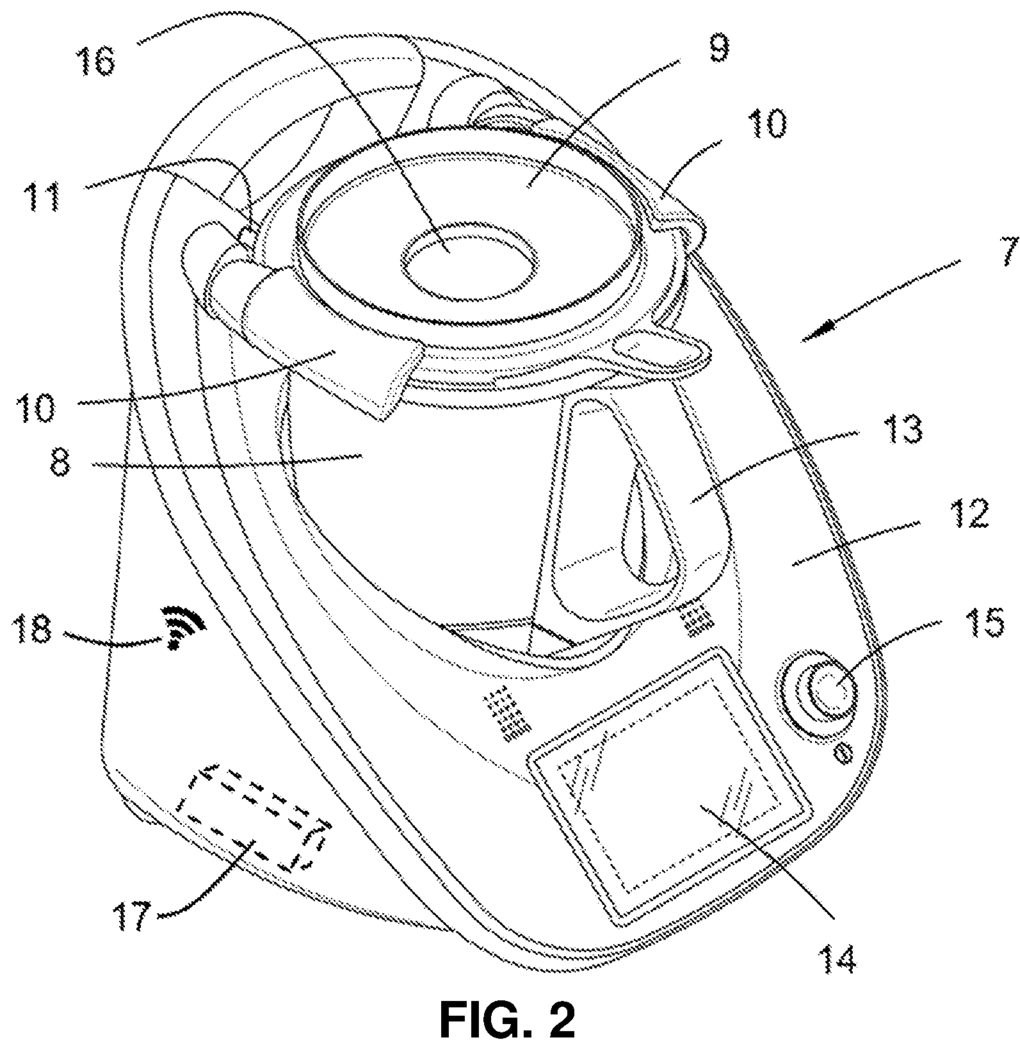
Figure 3:
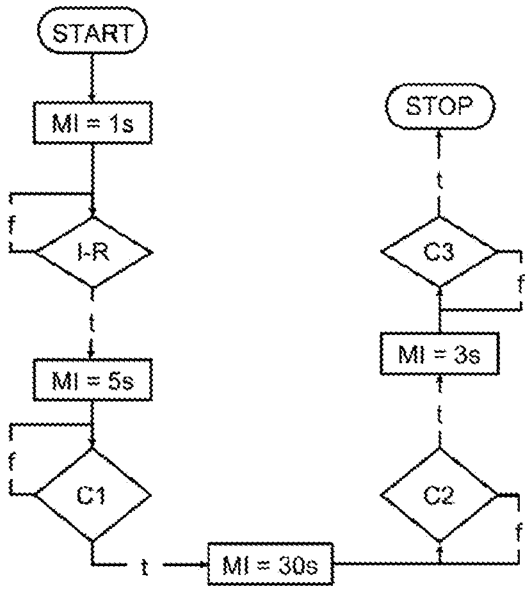
Figure 4:
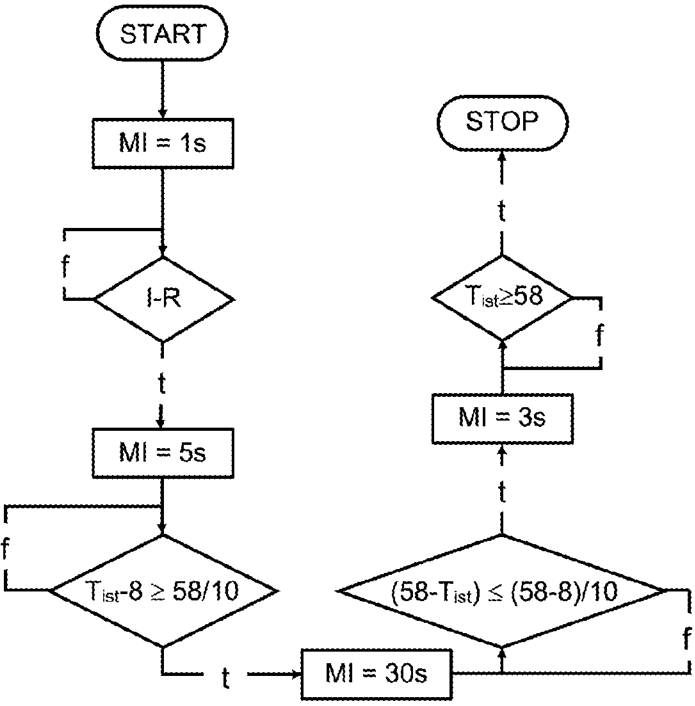

The present disclosure is explained in more detail below by means of figures. The figures show:

FIG. 1: Food thermometer during food preparation;

FIG. 2: Food processor;

FIG. 3: Flowchart for a preparation of a food;

FIG. 4: Flowchart for a preparation of a steak.

DETAILED DESCRIPTION

FIG. 1 shows a pen-shaped food thermometer 1 which is inserted into a bread dough 2 with its tip. The bread dough 2 is located in a kitchen appliance. The kitchen appliance is an oven 3. The bread dough 2 is heated in the oven 3. The food thermometer 1 determines temperatures in the baking oven 3 in a spatially resolved manner which are determined by means of two temperature sensors 5 and 6 both outside the bread dough 2 and inside the bread dough 2. These determined temperatures are sent by a radio unit 4 to an external control device. The bread preparation is controlled by the control device. This can be done by directly controlling the temperature of the oven 3 or by instructions to a user how to change the temperature of the oven 3, the type of temperature supply and/or the arrangement of the bread dough 2 within the oven 3. By type of temperature supply is meant choices such as top heat, bottom heat, or convection. Arrangement means where in the oven 3 the bread dough 2 is to be located.

A battery of the food thermometer 1 is preferably arranged at the tip to protect the battery from excessive heat.

FIG. 2 shows a food processor 7 with a food preparation vessel 8. A lid part 9 is placed on the food preparation vessel 8. The lid part 9 for the food preparation vessel 8 is locked by arm-like locking elements, i.e. arms 10. The lid part 9 is located between the two arms 10. The arms 10 can be rotated around their longitudinal axis in a motorized manner and thus back and forth between an open position and a locked position. The lid part 9 has pressed down and, thus, triggered a sensor, namely a rocker arm 11 of an electric switch. The arm-like locking members 10 and the rocker arm 11 are attached to a stand part 12 of the food processor 7. The food preparation vessel 8 is inserted into the stand part 12 and can be removed from the stand part 12. In order to be able to remove the food preparation vessel 8, this comprises a handle 13. For operation, the stand part 12 comprises a touch-sensitive display 14 and a rotary switch 15. The rotary switch 15 can be rotated and pressed. Display 14 and rotary switch 15 are thus control elements of the food processor 7. The lid part 9 comprises an opening 16 in the center, which can be closed with a vessel-like closure.

A control device 17 is located in the stand part 12. Data can be entered into the control device via the control elements 14 and 15. A radio unit 18 by means of which data can transmitted and received wirelessly is located in the stand part 12. The control device 17 can access an externally stored recipe via the radio unit 18. Subsequently, the control device 17 can control the preparation of a food by means of the recipe. Via the radio unit 18, the control device 17 can exchange data wirelessly with the food thermometer 1, i.e. communicate. Suitable protocols for the radio unit are for example Bluetooth and/or WIFI. However, alternatively or complementary, recipes can also be stored in a memory unit of the control device.

A cutting tool that can be driven by a motor is located in the food preparation vessel 8. The motor is located in the stand part 12. A heating device is provided in the base of the food preparation vessel 8, which can be electrically connected to the stand part 12 for heating.

The control device 17 of the food processor 7 may have received a recipe for preparing a bread. The control device 17 may have controlled the preparation of the bread dough 2. The bread dough 2 must now be suitably heated in the oven 3. This can now be controlled by the control device 17.

FIG. 3 shows a possible flow chart for heating the bread dough 2 through the oven 3 by means of the food thermometer 1.

After the switching-on of the food thermometer 1, it first initializes in such a way that the interval MI is, for example, one second. Temperatures are then measured every second by at least one or both temperature sensors 5, 6. Initializing produces a radio connection between the control device 17 and the food thermometer 1. The radio connection can be a Bluetooth connection.

The control device 17 then checks according to step I-R whether a recipe is present. The control device 17 can additionally check whether a present recipe has been processed to such an extent that the bread dough 2 must now be heated, i.e. baked. The bread dough is then a product to be cooked in the sense of the present disclosure. If the result is such that no recipe is available and/or has not yet been processed sufficiently far, the result is "false", which is represented by an "f" in FIG. 3. In this case, the control device repeats the check according to step I-R. If the result is that a recipe is present and has been processed sufficiently far, the result is "true", which is represented by a "t" in FIG. 3. The control device 17 now increases the interval MI to, for example, 5 seconds. The control device 17 may further visually and/or audibly instruct a user that the food thermometer 1 is to be inserted into the bread dough 2 as shown in FIG. 1, and that the bread dough 2 is to be placed into the oven 3. The control device may alternatively increase the interval MI to, for example, 5 seconds once the user has confirmed by operating a control element 14, 15 that the user has inserted the food thermometer 1 into the bread dough 2 and placed the bread dough 2 into the oven 3 as shown in FIG. 1.

The control device 17 now performs a check C1 as indicated in the flowchart. The check may comprise whether a temperature measured during heating, i.e. an actual temperature $T_{ist}$, is above a first temperature $T_1$ that has been specified (predetermined) by the recipe. In particular, the measured temperature is the temperature measured by the temperature sensor 5 arranged at the pointed end of the food thermometer 1 and thus the temperature measured inside the bread dough 2. However, the measured temperature can also be the temperature measured by the other temperature sensor 6 outside the bread dough 2. If the measured temperature is lower than the temperature specified by the recipe, the result of the check is "false". As shown in the flowchart in step C1 by "f", the check is repeated. If the result is "true", the interval MI is increased, for example to 30 seconds.

The check according to C1 may alternatively analyze temperature differences. For example, the check may comprise determining the difference between an initially measured start temperature $T_{start}$ and an actual temperature $T_{ist}$, i.e. $(T_{ist}-T_{start})$ The check may comprise determining the difference between an initially measured start temperature $T_{start}$ and a desired temperature $T_{soll}$, i.e. $(T_{soll}-T_{start})$. The desired temperature $T_{soll}$ may be a temperature specified by the recipe.

The check may comprise whether $(T_{ist}-T_{start})\geq(T_{soll}-T_{start})/X$ is satisfied, wherein X may be, for example, a positive number specified by the recipe, which may be greater than 1. If $(T_{ist}-T_{start})\geq(T_{soll}-T_{start})/X$ is satisfied, the result is "true" and the interval MI is increased, i.e. to 30 seconds in the case of the flowchart shown in FIG. 3. Otherwise the result is "false" and the check is repeated, for example as soon as a new actual temperature $T_{ist}$ has been measured.

If the interval has been further increased, for example to 30 seconds, the control device 17 performs a check C2. The check may again comprise whether a measured temperature, i.e. an actual temperature $T_{ist}$, is above a second temperature $T_2$ specified by the recipe.

Check C2 may alternatively analyze temperature differences. Thus, the check may comprise determining the difference between a desired temperature $T_{soll}$ and a respective measured actual temperature $T_{ist}$, i.e. $(T_{soll}-T_{ist})$. The check may comprise determining the difference between the initially measured start temperature $T_{start}$ and the desired temperature $T_{soll}$, i.e. $(T_{soll}-T_{start})$.

The check may comprise whether $(T_{soll}-T_{ist})\leq(T_{soll}-T_{start})/X$ is satisfied. If $(T_{soll}-T_{ist})\leq(T_{soll}-T_{start})/X$ is satisfied, the result is "true" and the interval MI is reduced, i.e. to 3 seconds in the case of the flow chart shown in FIG. 3. Otherwise the result is "false" and the check is repeated, for example as soon as a new actual temperature $T_{ist}$ has been measured.

If the interval MI has been reduced, the control device performs a check C3. It is checked whether the respectively measured actual temperature is equal to or greater than the desired temperature, i.e. whether $T_{ist} \geq T_{soll}$. If the respectively measured actual temperature is equal to or greater than the desired temperature, the measurement of temperatures by the food thermometer is stopped. It is also possible that the control device 17 then switches off the heating device of the oven 3.

The flow chart shown in FIG. 3 can also be applied to the preparation of other foods. For example, in the case of preparing a steak for the "medium" cooking mode, the desired temperature may be 58° C., which is to be reached inside the steak. Thus, $T_{soll}$=58° C. The control device 17 may have received this information from an electronically stored recipe. The steak may have been taken from the refrigerator. After the food thermometer 1 has been inserted into the steak, the food thermometer 1 may have measured a temperature of 8° C. inside the steak. $T_{ist}$ is therefore 8° C. at the beginning. This temperature of 8° C. is the start temperature $T_{start}$.

If the interval MI, with which temperatures are measured by the food thermometer 1, has been increased from 1 second to 5 seconds according to the flow chart of FIG. 4, the control device 17 subsequently checks for the steak preparation whether $T_{ist}-8 \geq 58/X$ is satisfied. It may have been specified by the recipe that X=10. The control device 17 then checks, as shown in the flow chart of FIG. 4, whether $T_{ist}-8 \geq 58/10$ or whether $T_{ist} \geq 13.8$. If the food thermometer 1 measures a temperature of more than 13.8° C., the control device 17 increases the interval of the food thermometer 1 to 30 seconds. Subsequently, the control device 17 checks whether the equation $(58-T_{ist}) \leq (58-8)/10$ is satisfied and consequently whether $T_{ist} \leq 53$. If an actual temperature of more than 53° C. is measured by the food thermometer 1, the interval MI is reduced to three seconds. The control device now checks whether the temperature measured by the food thermometer 1 inside the steak has reached or exceeded 58° C. As soon as the food thermometer 1 measures a temperature of at least 58° C. by means of its temperature sensor 5, the measurement of temperatures is stopped. The steak is prepared and ready to eat.

The invention also relates to a system comprising a food thermometer and a control device which can control the measurement of temperatures by the food thermometer. The control device is configured such that intervals between temperature measurements by the food thermometer are controlled depending on the preparation of a food. For example, if the interval is 1 second, then the measurement frequency or sampling rate is 1 Hz. Thus, a temperature is measured every second.

The control device comprises a data processing program for controlling intervals between temperature measurements. The control device may comprise a microprocessor or a microcontroller. The control device may comprise an electronic memory. In the memory, the program and/or recipes for the preparation of foods may be stored. The control device may be connected to a radio device.

Using the interval between two temperature measurements it is set how often the food thermometer performs measurements. The shorter the interval, the more often temperature measurements are performed and the sampling rate and power consumption of the food thermometer are correspondingly higher. The longer the interval, the less frequently temperature measurements are performed and the power consumption of the food thermometer is correspondingly smaller. The frequency of temperature measurements can be adapted to the demand during the preparation of a food. In this way, the power consumption of the food thermometer can be minimized.

Basically, each measured temperature is sent wirelessly in order to evaluate the measured temperatures and control the preparation of a food. Through the invention, also the power consumption can be minimized that must then be expended for wireless sending.

The control device may be configured such that the interval during the supply of heat to a product to be cooked is increased by the control device, in particular following a starting phase. At the beginning of a food preparation process, there is a need to measure temperatures relatively often. For example, there is a need to suitably adjust the power of a heating device via which heat is to be supplied to a product to be cooked. In order to be able to achieve this quickly, there may be a need to measure a prevailing temperature relatively often at the start of a food preparation, i.e. during a starting phase, and consequently to measure relatively many actual temperatures. There may also be a need to measure relatively often at the beginning of a food preparation in order to detect a malfunction at an early stage. If the power of the heating device is set appropriately, product to be cooked is merely heated up for a longer period of time without any need to intervene in the process of the preparation. The need for temperature measurements is low during this time. It is therefore advantageous to increase the interval following a starting phase. This reduces the power consumption of the electric food thermometer.

The control device can therefore be advantageously configured such that the interval for the food thermometer is increased as soon as a measured actual temperature is a predetermined value away from the initially measured start temperature. For example, the interval can be increased when a measured actual temperature is 2° C. to 10° C., preferably 3° C. to 7° C., away from a start temperature measured at the beginning of food preparation. The interval can then be increased from a time interval that is less than 10 seconds, for example, to a time interval that is more than 10 seconds, preferably more than 20 seconds. The interval between two temperature measurements at the beginning of the food preparation can be at least two or three seconds long. Thus, a temperature is then measured every two or three seconds. The interval following this starting phase of food preparation may be limited to a maximum of 60 seconds or a maximum of 40 seconds. Temperatures are then measured every 60 seconds or every 40 seconds.

If an actual temperature approaches a predetermined desired temperature, action may be required as soon as the actual temperature reaches the predetermined desired temperature. To avoid that the actual temperature does not exceed or at least hardly exceeds the predetermined desired temperature, the temperature can be measured relatively often by the food thermometer as soon as the actual temperature is no longer far away from the desired temperature. Therefore it is advantageous to increase the interval during the supply of heat to a product to be cooked by the control device at first, but eventually to decrease it again. At least, the control device is advantageously configured such that the interval during the supply of heat to a product to be cooked is decreased by the control device when measured actual temperatures approach a predetermined desired value. Thus, the interval of the food thermometer during the supply of heat to a product to be cooked is then reduced by the control device towards the end of the cooking time.

The control device can therefore be advantageously configured such that the interval for the food thermometer is reduced as soon as a measured actual temperature is only 2° C. to 10° C., preferably only 3° C. to 7° C., away from a predetermined desired temperature. The interval can then be reduced, for example, from a value that is, for example, between 15 seconds and 60 seconds to a value that is, for example, between 1 to 10 seconds, preferably between 2 to 5 seconds.

Since the exact reaching of the desired temperature is regularly particularly important for the success of a food, the interval can be shortest in this ending phase of the food preparation. There was then no interval during the preparation of a food that would have been shorter.

If it is required for the food preparation that the desired temperature be maintained very accurately for a predetermined time after the desired temperature has been reached, it may be appropriate for the food thermometer to continue measuring temperatures after the desired temperature has been reached. It may be appropriate that even after the desired temperature is reached, the interval remains short and is therefore not changed, for example.

Only during an initialization phase after the start or switching-on of a food thermometer can there be an even shorter interval. However, the even shorter interval is then not intended to perform measurements for a food preparation. Instead, the even shorter interval may be provided to achieve an operational state of the food thermometer as quickly as possible. The even shorter interval may be, for example, 0.1 to 3 seconds or 0.5 to 2 seconds long. The control device may therefore be configured such that by the food thermometer, following a switching-on of the food thermometer, the interval between temperature measurements is initially short and the interval between temperature measurements is thereafter longer. The larger interval following the initialization phase may be at least two or three seconds long.

The control device can be configured such that it defines an interval for temperature measurements depending on a measured actual temperature and a desired temperature and/or start temperature. If desired temperature and start temperature are relatively far apart, particularly long intervals for temperatures of, for example, at least 30 seconds or 40 seconds may be provided during a phase that lies between a starting phase and an ending phase. Desired temperature and start temperature are relatively far apart, for example, if the difference between desired temperature and start temperature is at least 40° C., preferably at least 60° C. By ending phase is meant a phase towards the end of a cooking time.

It has been found useful that the control device analyzes differences between measured actual temperature and start temperature and/or desired temperature and depending thereon controls the length of the interval in order to keep the energy consumption of the food thermometer particularly low.

For example, the control device can form the difference between a measured actual temperature and a measured start temperature. If this difference is equal to or greater than the difference between the desired temperature and the start temperature divided by a number X, the interval is increased. X can be a positive number greater than 1, preferably greater than 2, particularly preferably greater than 5. X is preferably less than 20 or less than 15. The number X and/or the desired temperature may be stored in an electronically stored recipe for the control device. The number X may be a measure of the time provided for applying heat to the product to be cooked according to the recipe. The number X can be a measure of the time provided for heating product to be cooked until a desired temperature according to the recipe is reached. This then advantageously takes into account the time available for setting intervals.

For example, the control device can form the difference between a desired temperature and a measured actual temperature. If this difference is equal to or smaller than the difference between the desired temperature and the start temperature divided by a number X, the interval is reduced. X is a positive number which may be greater than 1 preferably greater than 2, particularly preferably greater than 5. X is preferably less than 20 or less than 15. The number X and/or the desired temperature may be stored in an electronically stored recipe for the control device.

However, the number X can also be stored in the control device. The number X can therefore depend on a recipe or be fixed. A dependence on the recipe is preferable in order to achieve particularly good cooking results.

The intervals between the starting phase and the ending phase can first be increased in steps and/or then decreased in steps. It is therefore possible, for example, that an interval in the starting phase is initially 2 to 8 seconds long, then is initially increased to 8 seconds to 15 seconds and then to 15 seconds to 60 seconds. Following the increase in the interval to 15 seconds to 60 seconds, the interval can be reduced to 8 seconds to 15 seconds until the ending phase is reached, and then further be reduced when the ending phase is reached. Intervals between the starting phase and the ending phase can also be increased and/or reduced continuously or at least quasi-continuously.

The control device may be configured such that it can access an electronically stored recipe and extract the desired temperature from the electronically stored recipe. The recipe may be such that a user is guided step-by-step, by means of the control device, as to what actions to take, when and how, to prepare a desired food. The recipe may be such that one or more kitchen appliances are controlled step by step by means of the control device so that a desired food can be prepared by means of the one or more kitchen appliances.

In one embodiment, one or more intervals are specified in the electronically stored recipe. The control device can then extract the one or more intervals from the recipe and control the intervals accordingly. For example, the recipe may relate to producing a bread and provide a baking time of 60 minutes. In the recipe it may then be stored that the interval should be 5 seconds in the first 15 minutes. After the first 15 minutes have elapsed, the interval should then be 10 seconds according to the recipe, for example, for half an hour. For the last 15 minutes, the interval should be 8 seconds according to the recipe, for example. The control device then sets the intervals according to the values stored in the recipe during baking.

The control device may be configured such that it increases an interval once the food thermometer has been inserted into a product to be cooked. The control device can be configured such that it can detect the insertion of the food thermometer into a product to be cooked in an automated manner. The insertion of the food thermometer into a product to be cooked can, for example, be detected in an automated manner on the basis of a sudden change in temperature. If temperature sensors at the food thermometer are arranged in such a way that temperatures can be measured both outside and inside a product to be cooked, the sudden occurrence of a temperature difference between the temperature sensors can be used for automated detection. The automated detection can be done using a camera. Following insertion of the food thermometer into a product to be cooked, this insertion can alternatively or additionally be communicated to the control device by a user operating a corresponding control element. For example, the user can operate the control element following a request controlled by the control device to confirm the insertion of the food thermometer into a product to be cooked.

The control device may be configured such that the measurement of temperatures by the food thermometer is terminated when a measured actual temperature is at least equal to a desired temperature determined by the control device. If the desired temperature is reached, the preparation may be finished. This may be a reason why the measurement of temperatures by the food thermometer is terminated. The control device may then be additionally configured such that it turns off the heating device with which heat has been supplied to the product to be cooked. If the desired temperature is reached, it may be necessary to keep the product to be cooked at the desired temperature for a predetermined time. For example, measurement by means of the food thermometer can then be dispensed with because the associated kitchen appliance is capable of independently maintaining an associated interior temperature at a required value.

If the temperature of a product to be cooked is to be temporarily maintained at a predetermined temperature during its preparation, the interval during this time can be smaller than an earlier and/or later interval during the supply of heat to the product to be cooked. In this way it can be ensured that the predetermined temperature is exactly maintained. Before or after this, there may be phases in which merely longer periods of heating or cooling take place. Therefore, intervals can be longer or larger.

The control device may be configured such that it forms an average from several temperature measurements for each temperature sensor of the food thermometer. In this way, errors due to measurement inaccuracies can be avoided.

The control device may be configured such that the energy consumption of the food thermometer is minimized between two measurements. For example, the food thermometer may comprise a radio unit that periodically sends radio signals. The sending of radio signals may then be reduced to further minimize the energy consumption of the food thermometer between two measurements. Thus, between two measurements, the energy consumption of secondary consumers such as radio unit may be reduced under control of the control device.

The control device can be configured such that it controls the supply of heat to a product to be cooked. For example, the control device may control the heating power of an oven in which a food is being prepared. The supply of heat can be controlled depending on the temperatures measured by means of the food thermometer. For example, the control device may be configured such that the heat output is high when measured actual temperatures are far from a desired temperature. For example, the control device may be configured such that the heating power is reduced when measured actual temperatures are no longer far from a desired temperature.

The invention claimed is:

1. A control device for a food thermometer, the control device configured to control the measurement of temperatures by the food thermometer, wherein the control device is further configured such that:

an interval between temperature measurements by the food thermometer is controlled depending on the preparation of a food; and the control device is configured to access an electronically stored recipe and to extract a desired temperature from the electronically stored recipe, wherein control device is configured such that it increases the interval when $(T_{ist}-T_{start}) \geq (T_{soll}-T_{start})/X$ and/or decreases the interval when $(T_{soll}-T_{ist}) \leq (T_{soll}-T_{start})/X$, wherein $T_{ist}$ is a measured actual temperature, $T_{soll}$ is the desired temperature, $T_{start}$ is a temperature in a product to be cooked prior to a supply of heat to the product to be cooked, and X is a number greater than 1.

2. The control device of claim 1, wherein the control device is configured such that the interval is increased during the supply of heat to the product to be cooked following a starting phase by the control device.

3. The control device of claim 2, wherein the control device is configured such that the interval during the supply of heat to a product to be cooked is decreased again by the control device after the interval has been increased.

4. The control device of claim 1, wherein the control device is configured such that the interval during the supply of heat to the product to be cooked is reduced towards the end of the cooking time by the control device.

5. The control device of claim 1, wherein the control device is configured such that by the food thermometer, following a switching-on of the food thermometer, the interval between temperature measurements is initially small and the interval between temperature measurements is thereafter larger.

6. The control device of claim 1, wherein the control device is configured such that during the preparation of a food a short interval is 1 to 10 seconds long and a large interval is 10 to 60 seconds long.

7. The control device of claim 1, wherein the control device is configured such that it defines an interval depending on the measured actual temperature and a desired temperature and/or a start temperature.

8. The control device of claim 7, wherein control device analyzes differences between the measured actual temperature and the start temperature and/or the desired temperature and controls the size of the interval depending thereon.

9. The control device of claim 1, wherein control device is configured such that it is able to access the electronically stored recipe and to extract one or more intervals from the electronically stored recipe.

10. The control device of claim 1, wherein the control device is configured such that the measurement of temperatures by the food thermometer is terminated when a measured actual temperature is at least equal to a desired temperature determined by the control device.

11. The control device of claim 1, wherein the control device is configured such that it forms an average value from a plurality of temperature measurements for at least one temperature sensor of the food thermometer.

12. The control device of claim 1, wherein the control device is configured such that the energy consumption of the food thermometer between two measurements is minimized by reducing the power of secondary consumers or switching off secondary consumers.

13. The control device of claim 1, wherein the control device is configured such that it controls the supply of heat to a product to be cooked.

14. A system comprising a food thermometer, and a control device configured to control the measurement of temperatures by the food thermometer, wherein the control device is further configured such that an interval between temperature measurements by the food thermometer is controlled depending on the preparation of a food, wherein the control device is configured such that following a switching-on of the food thermometer, the interval between temperature measurements is initially small during an initialization phase and the interval between temperature measurements after the initialization phase is larger, wherein during the initialization phase a radio connection is made between the control device and the food thermometer, wherein the control device is configured such that the interval is increased during the supply of heat to a product to be cooked following a starting phase by the control device, wherein the control device is further configured to access an electronically stored recipe and to extract a desired temperature from the electronically stored recipe, and wherein the control device is further configured such that it increases the interval when $(T_{ist}-T_{start}) \geq (T_{soll}-T_{start})/X$ and/or decreases the interval when $(T_{soll}-T_{ist}) \leq (T_{soll}-T_{start})/X$, wherein $T_{ist}$ is a measured actual temperature, $T_{soll}$ is the desired temperature, $T_{start}$ is a temperature in a product to be cooked prior to a supply of heat to the product to be cooked, and X is a number greater than 1.

15. The control device of claim 14, wherein the control device is configured such that the interval during the supply of heat to a product to be cooked is decreased again by the control device after the interval has been increased.

16. The control device of claim 14, wherein the control device is configured such that the interval during the supply of heat to a product to be cooked is reduced towards the end of the cooking time by the control device.

17. The system of claim 14, wherein the initialization phase begins following the switching-on of the food thermometer and ends prior to the starting phase, and wherein the starting phase begins after the initialization phase at a beginning of the preparation of food.

18. A system comprising a food thermometer, and a control device configured to control the measurement of temperatures by the food thermometer, wherein the control device is further configured such that an interval between temperature measurements by the food thermometer is controlled depending on the preparation of a food, wherein the control device is configured such that following a switching-on of the food thermometer, the interval between temperature measurements is initially small during an initialization phase and the interval between temperature measurements after the initialization phase is larger, wherein during the initialization phase a radio connection is made between the control device and the food thermometer, wherein the control device is configured such that the interval is increased during the supply of heat to a product to be cooked following a starting phase by the control device, and wherein the initialization phase begins following the switching-on of the food thermometer and ends prior to the starting phase, and wherein the starting phase begins after the initialization phase at a beginning of the preparation of food.

* * * * *